(12) United States Patent
Jain

(10) Patent No.: US 9,172,721 B2
(45) Date of Patent: Oct. 27, 2015

(54) SCALABLE INLINE BEHAVIORAL DDOS ATTACK MITIGATION

(71) Applicant: Fortinet, Inc., Sunnyvale, CA (US)

(72) Inventor: Hemant Kumar Jain, Milpitas, CA (US)

(73) Assignee: Fortinet, Inc., Sunnyvale, CA (US)

( * ) Notice: Subject to any disclaimer, the term of this patent is extended or adjusted under 35 U.S.C. 154(b) by 62 days.

(21) Appl. No.: 13/943,085

(22) Filed: Jul. 16, 2013

(65) Prior Publication Data

US 2015/0026800 A1    Jan. 22, 2015

(51) Int. Cl.
*G06F 11/00* (2006.01)
*H04L 29/06* (2006.01)

(52) U.S. Cl.
CPC ............ *H04L 63/1458* (2013.01); *H04L 63/20* (2013.01)

(58) Field of Classification Search
None
See application file for complete search history.

(56) References Cited

U.S. PATENT DOCUMENTS

| | | |
|---|---|---|
| 5,805,801 A | 9/1998 | Holloway et al. |
| 5,919,257 A | 7/1999 | Trostle |
| 5,931,946 A | 8/1999 | Terada et al. |
| 5,991,881 A | 11/1999 | Conklin et al. |
| 6,016,546 A | 1/2000 | Kephart et al. |
| 6,088,804 A | 7/2000 | Hill et al. |
| 6,115,680 A | 9/2000 | Coffee et al. |
| 6,279,113 B1 | 8/2001 | Vaidya |
| 6,301,668 B1 | 10/2001 | Gleichauf et al. |
| 6,321,338 B1 | 11/2001 | Porras et al. |
| 6,408,297 B1 | 6/2002 | Ohashi |
| 6,711,127 B1 | 3/2004 | Gorman et al. |
| 6,904,057 B2 | 6/2005 | Sarkinen et al. |
| 6,928,549 B2 | 8/2005 | Brock et al. |
| 6,934,850 B2 | 8/2005 | Sato |
| 6,944,168 B2 | 9/2005 | Paatela et al. |
| 6,944,678 B2 | 9/2005 | Lu et al. |
| 7,426,634 B2 | 9/2008 | Jain |
| 7,602,731 B2 | 10/2009 | Jain |
| 7,626,940 B2 * | 12/2009 | Jain ............................... 370/252 |
| 7,987,493 B1 * | 7/2011 | Reams et al. ..................... 726/1 |
| 8,613,089 B1 * | 12/2013 | Holloway et al. ............... 726/23 |
| 8,997,227 B1 * | 3/2015 | Mhatre et al. ................... 726/23 |
| 2002/0032871 A1 | 3/2002 | Malan et al. |
| 2002/0035698 A1 | 3/2002 | Malan et al. |
| 2002/0083175 A1 | 6/2002 | Afek et al. |

(Continued)

OTHER PUBLICATIONS

Carle et al., Real-time Analysis of Flow Data for Network Attack Detection, copyright 2007, IEEE, 9 pages.*

(Continued)

*Primary Examiner* — Luu Pham
*Assistant Examiner* — Baotram Tran
(74) *Attorney, Agent, or Firm* — Hamilton, DeSanctis & Cha LLP

(57) ABSTRACT

Methods and systems for a scalable solution to behavioral Distributed Denial of Service (DDoS) attacks targeting a network are provided. According to one embodiment, a method to determine the scaling treatment is provided for various granular layer parameters of the Open System Interconnection (OSI) model for communication systems. A hardware-based apparatus helps identify packet rates and determine packet rate thresholds through continuous and adaptive learning with multiple DDoS attack mitigation components. The system can be scaled up by stacking multiple DDoS attack mitigation components to provide protection against large scale DDoS attacks by distributing load across these stacked components.

20 Claims, 8 Drawing Sheets

(56) References Cited

U.S. PATENT DOCUMENTS

| | | | |
|---|---|---|---|
| 2002/0101819 A1 | 8/2002 | Goldstone | |
| 2002/0144156 A1 | 10/2002 | Copeland, III | |
| 2003/0065943 A1 | 4/2003 | Geis et al. | |
| 2004/0054924 A1* | 3/2004 | Chuah et al. | 713/201 |
| 2005/0111367 A1* | 5/2005 | Chao et al. | 370/235 |
| 2006/0146816 A1* | 7/2006 | Jain | 370/389 |
| 2007/0124687 A1* | 5/2007 | Wing et al. | 715/741 |
| 2009/0293123 A1* | 11/2009 | Jackson et al. | 726/23 |
| 2011/0138463 A1* | 6/2011 | Kim et al. | 726/22 |
| 2013/0145464 A1* | 6/2013 | Lyon | 726/22 |
| 2014/0047542 A1* | 2/2014 | Holloway et al. | 726/23 |
| 2014/0304798 A1* | 10/2014 | Iyengar et al. | 726/11 |

OTHER PUBLICATIONS

Chen et al., Practical Techniques for Defending against DDoS Attacks, copyright 2005, IEEE, 8 pages.*
Le et al., Correlation-Based Load Balancing for Network Intrusion Dection and Prevention Systems, copyright 2008, ACM, 10 pages.*
Park et al., on the Effectiveness of Route-Based Packet Filtering for Distributes DoS Attack Prevention in Power-Law Internets, copyright 2001, ACM, 12 pages.*
Thomas Gamer, Distributed Detection of Large-Scale Attacks in the Internet, copyright 2008, ACM, 2 pages.*
Tupakula et al., Intrusion Dection Techniques for Infrastructure as a Service Cloud, copyright 2011, IEEE, 8 pages.*
Zori et al., Stone: A Stream-based DDoS Defense Framework, copyright 2013, ACM, 9 pages.*
NetScreen concepts and examples: screen OS reference guide, vol. 2: fundamentals PIN 09-0520-000 Rev F, pp. 34-44. Retrieved from the Internet: <URL: http://www.netscreen.com/support/downloads/CE-v2.pdf>.
Connie Howard, "Security consideration at the data link layer: layer 2 the weakest link," Packet Magazine, fist Quarter 2003, pp. 30-33.
Rik Farrow, "VLANs: virtually insecure?" Network Magazine, Mar. 2003.
Stephen R. Lawrence, "Demand forecasting, time series models." Retrieved from the Internet: <URL: http://wwwbus.colorado.edu/facultyllawrence/tools/FORECASTIforecast. ppt>.
A multi-agent based system for intrusion detection; Hegazy, I.M.; Al-Arif, T.; Fayed, Z.T.; Faheem, H.M.; Potentials, IEEE vol. 22, Issue 4, Oct.-Nov. 2003 pp. 28-31.
J. Postel, J. Reynolds, "Telnet Protocol Specifications", RFC 854, May 1983.
J. Postel, J. Reynolds, "File Transfer Protocol (FTP)", RFC 959, May 1985.
Architecture for a hardware based, TCP/IP content scanning system [intrusion detection system applications]; Schuehler, D.V.; Moscola, J.; Lockwood, J.; High Performance Interconnects, 2003. Proceedings. 11th Symposium on Aug. 20-22, 2003 pp. 89-94.
http://www.idt.com/docs/75K6213452134.sub.--DS.sub.--80635. pdf 4.5M and 9M Network Search Engine (NSE) with QDR.TM. Interface.
G. Iannaccone, S. Jaiswal and C. Diot, "Packet Reordering Inside the Sprint Backbone," Tech. Report, TR01-ATL-062917, Sprint ATL, Jun. 2001.
E. Blanton and M. Allman, "On Making TCP More Robust to Packet Reordering", ACM Computer Comm. Review, 32 (1), Jan. 2002, pp. 20-30.
M. Laor and L. Gendel, "The Effect of Packet Recordering in a Backbone Link on Application Throughput," IEEE Network, Sep./Oct. 2002, pp. 28-36.
Girish P. Chandranmenon et al., "Reconsidering Fragmentation and Reassembly," Aug. 1, 1997, Washington University in St. Louis, pp. 1-23.
T. Banka, A. A. Bare and A. P. Jayasumana, "Metrics for Degree of Reordering in Packet Sequences," Proc. 27th IEEE Conference on Local Computer Networks, Nov. 2002, pp. 333-342.
J. Bellardo and S. Savage, "Measuring Packet Reordering," Proc. IMW'02, Nov. 2002, pp. 97-105.
S. Jaiswal, G. Iannaccone, C. Diot, J. Kurose and D. Towsley, "Measurement and Classification of Out-of-sequence Packets in Tier-1 IP Backbone," Proc. IEEE INFOCOM, Mar. 2003, pp. 1199-1209.
Chris Clark, Wenke Lee, David Schimmel, Didier Contis, Mohamed Kone and Ashley Thomas, "A Hardware Platform for Network Intrusion Detection and Prevention", Workshop on Network Processors & Applications—NP3, Feb. 14-15, 2004, Madrid, Spain.
Colleen Shannon, David Moore, k claffy, "Characteristics of Fragmented IP Traffic on Internet Links", PAM2001—A workshop on Passive and Active Measurements, RIPE NCC, (Amsterdam, Netherlands), 2001.
Thomas H. Ptacek; Timothy N. Newsham, "Insertion Evasion and Denial of Service Eluding Network Intrusion Detection", Secure Networks, Jan. 1998.
David V. Schuehler John Lockwood, "TCP-Splitter a TCPIP Flow Monitor in Reconfigurable Hardware", IEEE Micro, Jan./Feb. 2003.
Marc Necker, Didier Contis, David Schimmel, "TCP-Stream Reassembly and State Tracking in Hardware", Proceedings of the 10 th Annual IEEE Symposium on Field-Programmable Custom Computing Machines (FCCM'02).
David V. Schuehler, James Moscola, John Lockwood, "Architecture for a Hardware Based, TCP/IP Content Scanning System", Proceedings of Hot Interconnects 11 (Hotl-11), Stanford, CA, Aug. 20-22, 2003, pp. 89-94.
P. Mockapetris, "Domain Names—Implementation and Specification", RFC 1035, Nov. 1987.
Sun Microsystems, "RPC: Remote Procedure Call Protocol Specification Version 2", RFC 1057, Jun. 1988.
J. Myers, M. Rose, "Post Office Protocol—Version 3", RFC 1939, May 1996.
R. Fielding, et. al, "Hypertext Transfer Protocol—HTTP/1.1", RFC 2616, Jun. 1999.
J. Klensin, "Simple Mail Transfer Protocol", RFC 2821, Apr. 2001.
David D. Clark, "IP Datagram Reassembly Algorithms", RFC 815, Jul. 1982.
http://www.ccsi.cs.sunysb.edu/elibrary/linux/network/iprecv4.pdf Internet pages, "IP Reassembly", downloaded on Oct. 19, 2004.
Adam Dunkels, "Minimal TCP/IP implementation with proxy support", SICS Tchnical Report T2001:20, ISSN 1100-3154.
David Watson, Matthew Smart, G. Robert Malan, "Protocol Scrubbing: Network Security Through Transparent Flow Modification", IEEE/ACM Transactions on Networking, vol. 12, No. 2, Apr. 2004.
Matthew V. Mahoney et al., "PHAD: Packet Header Anomaly Detection for Identifying Hostile Network Traffic," Florida Institute of Technology Technical Report CS-2001-04, pp. 1-17.
Sun Microsystems, Inc., "RPC: Remote Procedure Call" RFC 1050, Apr. 1988.
http://www.syngress.com/book.sub.--catalog/244.sub.--snort/sample.pdf, "Preprocessors", Internet pages downloaded on Oct. 19, 2004.
Jeff Forristal, "Fireproofing against DoS attacks," Network Computing, Dec. 10, 2001. pp. 65-74.
Rocky K. C. Chang, "Defending against flooding-based distributed denial-of-service attacks: a tutorial," IEEE Communications Magazine, Oct. 2002, pp. 42-51.
David Moore et al., "Inferring internet denial-of-service activity," CAIDA. 14 pgs.
Robert Beverly, "MS-SQL slammer/sapphire traffic analysis." http://rbeverly.net/resarch/slammer/. 6 pgs.
Jake D. Brutlag, "Aberrant behavior detection in time series for network monitoring," pp. 139-146. https://www.usenix.org/legacy/events/lisa00/full_papers/brutlag/brutlag_html/.
Schuehler, D.V. et al., Architecture for a hardware-based, TCP/IP content-processing system; IEEE Computer Society. Jan.-Feb. 2004. pp. 62-69.

* cited by examiner

SCALABLE INLINE BEHAVIORAL DDOS ATTACK MITIGATION

CROSS-REFERENCE TO RELATED PATENTS

This application relates to U.S. Pat. No. 7,426,634 entitled, "Method and apparatus for rate based denial of service attack detection and prevention", U.S. Pat. No. 7,602,731 entitled "System and method for integrated header, state, rate and content anomaly prevention with policy enforcement", and U.S. Pat. No. 7,626,940 entitled "System and method for integrated header, state, rate and content anomaly prevention for domain name service" all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013, Fortinet, Inc.

BACKGROUND

1. Field

Embodiments of the present invention relate generally to Distributed Denial of Service (DDoS) attacks and specifically to inline DDoS attack mitigation for high rate traffic and high rate DDoS attacks.

2. Description of the Related Art

Distributed Denial of Service (DDoS) attacks have been growing in their size over the years. Due to easy availability of large servers and increased bandwidth, it is easy for attackers to create large attacks that run in multiples of Gigabits per second. These attacks have to be stopped using inline appliances due to the inherent nature of the attacks.

Inline appliances for DDoS attacks have an inherent limitation due to their processing power which in turn is limited due to technology at any given time. For example an inline DDoS attack mitigation hardware logic appliance may have a throughput capacity of 10 Gbps but the attacks may operate at a much larger rate than that.

An innovative approach is therefore required to increase the overall throughput.

SUMMARY

Innovative methods and systems are described for an integrated solution to distributed denial of service (DDoS) attacks. In one embodiment, a DDoS mitigation solution is provided that can be scaled to handle large scale DDoS attacks by stacking multiple processing components.

Behavioral DDoS attack mitigation appliances have three essential components for attack mitigation, viz. packet rate calculation, adaptive threshold estimation, and attack mitigation based on the adaptively estimated thresholds.

Embodiments of the present invention reflect an innovative approach to obtaining packet rates and counts when there are multiple mitigation components stacked together to provide a higher throughput for attack mitigation such that when traffic is distributed across multiple stacked components, aggregate information is available to the controlling host. This aggregate information is then used to set the behavioural thresholds.

Other features of embodiments of the present disclosure will be apparent from accompanying drawings and from detailed description that follows.

DETAILED DESCRIPTION

Figure 1:
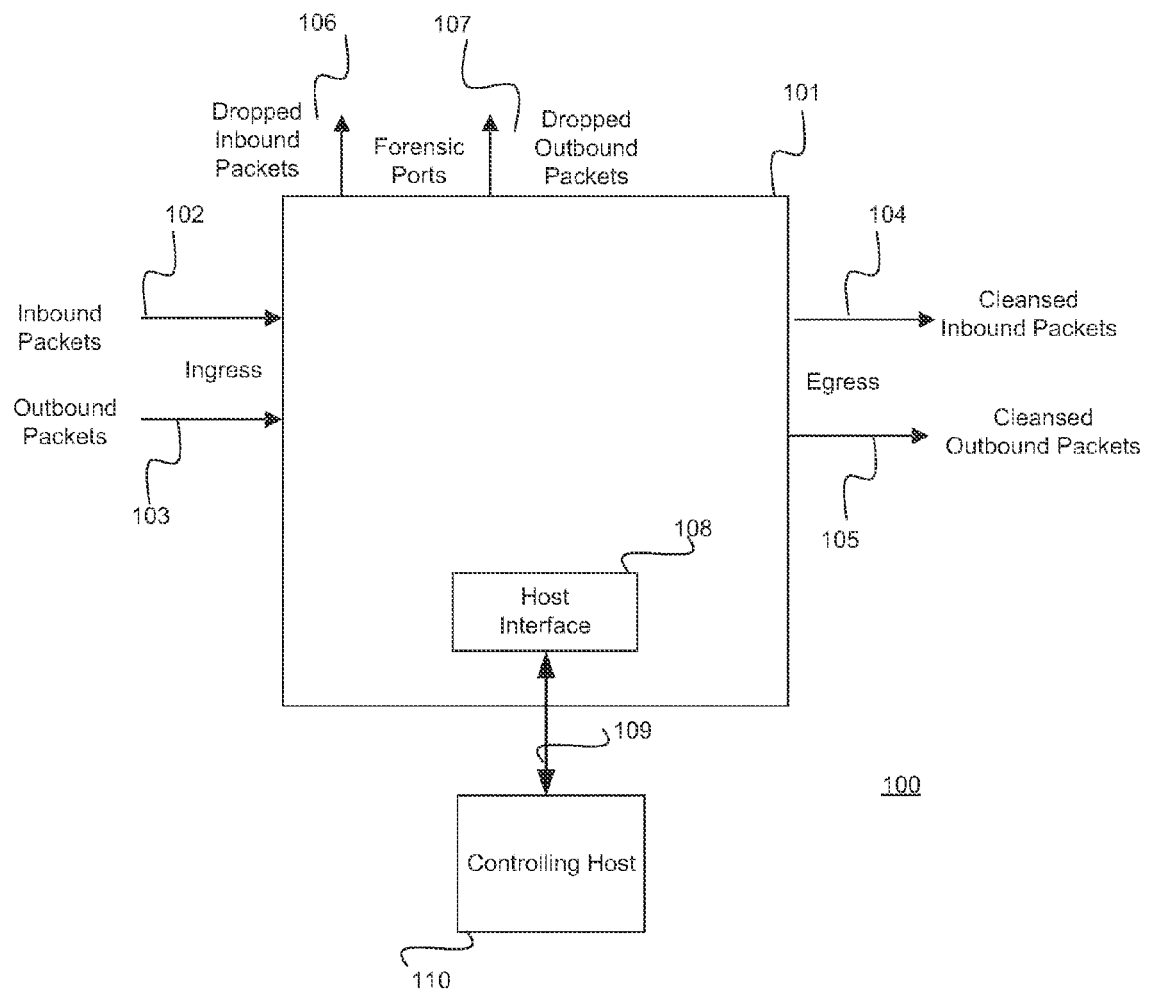
FIG. 1 illustrates an exemplary inline DDoS attack mitigation apparatus known in the art.

Methods and systems are described for a scalable solution to the rate based distributed denial of service attacks targeting a network. Embodiments of the present invention provide a solution that can be scaled by stacking multiple attack mitigation components. In one embodiment, a single hardware based appliance integrates multiple attack mitigation components using a switch to distribute load across them while the host interface provides an ability to meter and aggregate behavioral rates to estimate adaptive thresholds which are then used to mitigate behavioral attacks.

The size of DDoS attacks have been growing as more powerful servers are available in large data centers with large Internet bandwidth. Mitigation components on the other hand have inherent limited throughput.

The new appliance described herein provides copper and optical connectivity. A packet interface connects with external network through a switch. The switch distributes packets to multiple DDoS attack mitigation components. These components decide whether to drop or to allow the incoming packets based on the behavioral policies set by the controlling host. The controlling host also interfaces with the stacked attack mitigation components to determine the rates and aggregates them in a manner described herein and programs the behavioral thresholds in the mitigation components. The controlling host also collects the mitigation statistics and makes such information available to the end user or the administrator of the apparatus.

Within the mitigation components, a packet classifier interfaces with continuous and adaptive granular rate anomaly engine. The engine collects meta-information about the packets and maintains the instantaneous packet-rates and compares against the thresholds set adaptively and continuously by the controlling host.

In an embodiment of the present invention, if a specific type of packets exceeds the rate threshold, packets of that type or belonging to that group are discarded for a certain time period by the packet interface. In another embodiment, the packets are rate limited granularly to the rate thresholds of various layer 2, 3, 4 and 7 parameters.

An object of various embodiments of the present invention is to provide a high-rate hardware based scalable system and method of preventing DDoS attack packets from going further, the packets having layers 2, 3, 4, and 7 rate anomalies as detected by the controlling host within the apparatus, which is continuously and adaptively adjusting granular layer 2, 3, 4 and 7 rate thresholds based on past base rate, trends and seasonality.

A further object of various embodiments of the present invention is to provide a Rate Anomaly Engine capable of continuously calculating the traffic rate on classified parameters and estimating the traffic rate thresholds adaptively and thus determining the thresholds. The controlling host either finds the sum of the counters or finds the maximum of traffic rates from among multiple Rate Anomaly Engines to determine an effective rate or count. This is subsequently used to determine the granular adaptive rate thresholds.

FIG. 1 depicts an exemplary apparatus 100 illustrating the functionality of a single DDoS attack mitigation component 101 for the mitigation of DDoS attacks. This type of prior art inline DDoS attack mitigation device is well known in the art. Therefore this component is treated as a black-box with a host interface being controlled by the controlling host. As noted in the Background, prior art inline DDoS attack mitigation devices suffer from limitations due to the inherent throughput limitations. In one embodiment of the present invention, multiple DDoS attack mitigation components 101 are stacked together and traffic is distributed across the stacked components to provide a higher throughput for attack mitigation.

Inbound packets 102 enter the DDoS attack mitigation component 101 and exit as cleansed inbound packets 104. Similarly, outbound packets 103 enter the DDoS attack mitigation component 101 and exit as cleansed outbound packets 105. The dropped packets make the difference between packets at ingress and at egress. For the purpose of forensic analysis, these dropped packets may be routed to two forensic ports viz. the dropped inbound packets 106, and the dropped outbound packets 107.

A controlling host 110 such as a management CPU uses the host interface 108 to read the controlling parameters and set the parameters of different blocks via the host interface using a bus 109 such as PCIe bus. The controlling host 110 also periodically reads the granular traffic rates and uses it to estimate threshold for rate parameters. The controlling host 110 also reads the mitigation statistics. In some embodiments, these events are subsequently logged and/or analyzed. In an exemplary embodiment, the controlling host can read the maximum packet rates for TCP SYN packets in two directions and set the adaptive thresholds for them through the host interface 108. In another exemplary embodiment, the controlling host can read the maximum count of concurrent connections per source in two directions and set the adaptive thresholds for them through the host interface 108.

Figure 2:
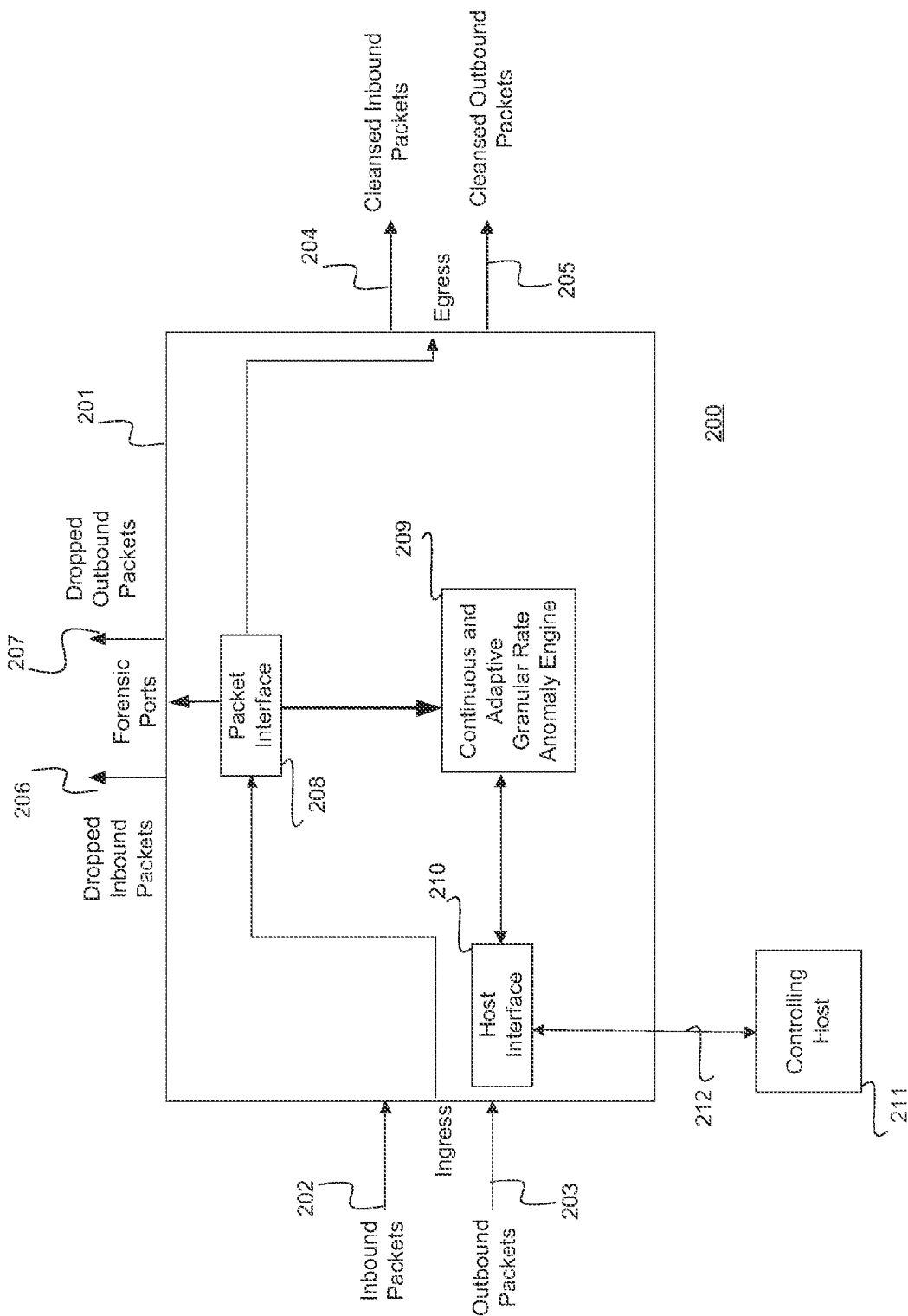
FIG. 2 schematically shows exemplary architectural components of the inline DDoS attack mitigation apparatus of FIG. 1.

FIG. 2 illustrates further details of the DDoS attack mitigation component 101 of FIG. 1, as 201. Inbound packets 202 enter the DDoS attack mitigation component 201 and exit as cleansed inbound packets 204. Similarly, outbound packets 203 enter the DDoS attack mitigation component 201 and exit as cleansed outbound packets 205. Packet interface 208 receives packets, buffers them, releases a copy of the packets to the continuous and adaptive granular rate anomaly engine 209, awaits decisions from continuous and adaptive granular rate anomaly engine 209 and subsequently either transmits them further or drops and/or transmits them on forensic ports 206 and 207.

The purpose of the continuous and adaptive granular rate anomaly engine 209 engine is to classify the incoming packets, meter the granular rates, provide this statistics to the controlling host 211 via host interface 210 via a bus 212 such as PCIe bus. The continuous and adaptive granular rate anomaly engine 209 also receives the granular behavioral rate thresholds from the controlling host 211 and enforces the behavioral thresholds and informs the packet interface 208 when to drop or to allow the packets. It also provides the drop statistics and other related statistics to the controlling host 211.

In an embodiment of the present invention, the granular rate means rates such as layer 2, 3, 4 and 7 parameters. For example layer 2 rates may include, but are not limited to, rates for ARP, RARP, Broadcast packets etc. Layer 3 rates may include, but are not limited to, protocols, fragmented packets, IP options, source rates etc. Layer 4 rates include TCP ports, UDP ports etc. Layer 7 rates may include, but are not limited to HTTP methods, HTTP User-Agents, URLs, SIP registration requests, DNS requests etc. Corresponding to each of these rates is an associated behavioral threshold and drop statistics.

Figure 3:
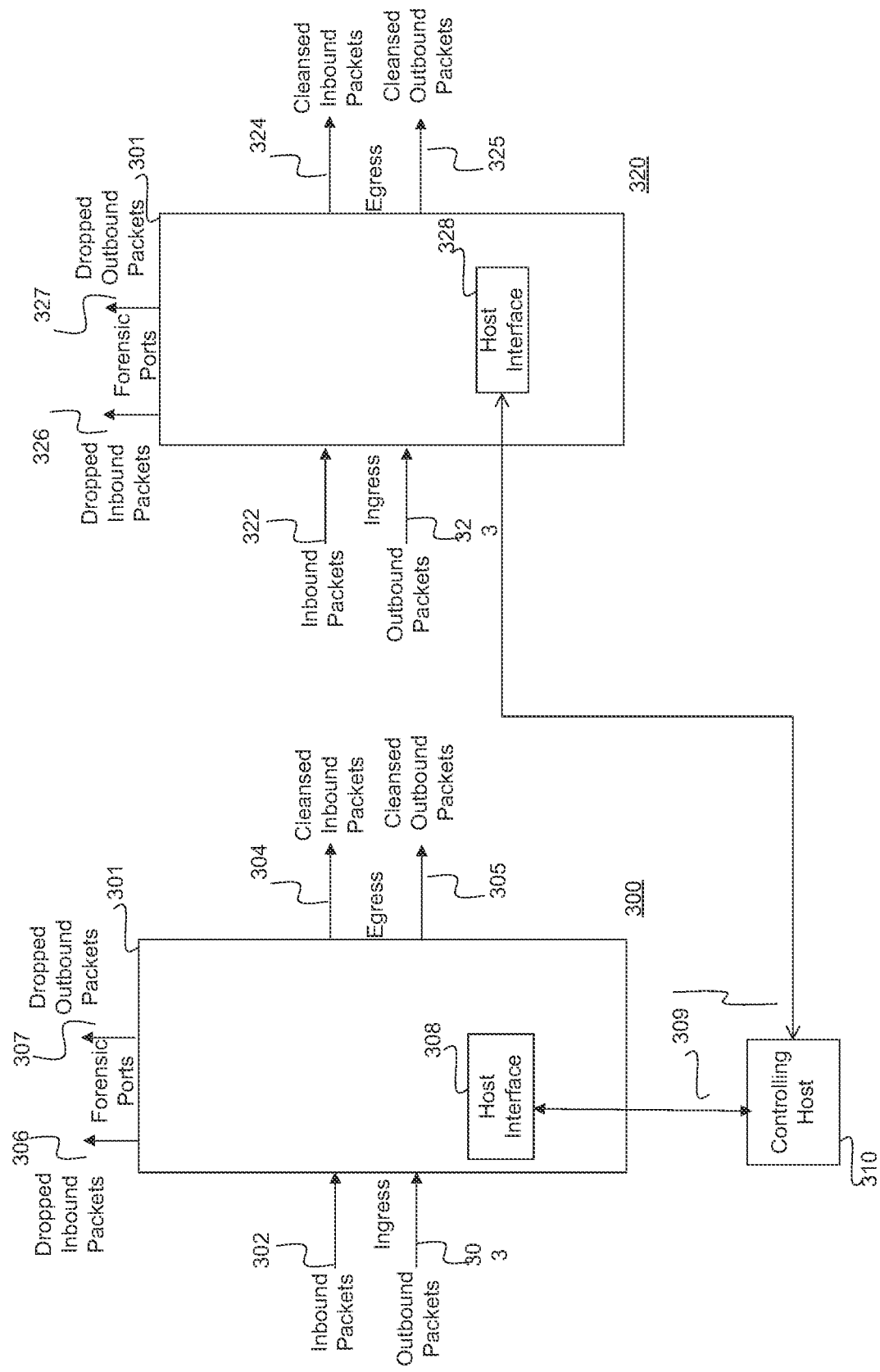
FIG. 3 illustrates an exemplary apparatus in accordance with an embodiment of the present invention in which two such inline apparatus have been stacked together with a single controlling host.

FIG. 3 illustrates an exemplary apparatus with two DDoS attack mitigation components 201 explained in FIG. 2. These components are controlled by a single controlling host 310. The usage of two DDoS attack mitigation components is for illustration purposes. Depending upon the particular implementation and desired throughput, an appropriate number of such DDoS attack mitigation components can be used.

In this particular example, it is assumed that load distribution to DDoS attack mitigation components 300 and 320 is outside the apparatus. In another embodiment, this load distribution functionality may be implemented within the apparatus using a switch as explained below with reference to FIG. 6.

Other blocks in FIG. 3, such as inbound packets 302 and 322, outbound packets 303 and 323, cleansed inbound packets 304 and 324, cleansed outbound packets 305 and 325, forensic ports 306, 307, 326 and 327, host interfaces 308 and 328, bus 309, controlling host 310 and 320 etc. may be the same as the corresponding blocks described with reference to FIG. 2.

The purpose of the controlling host in this exemplary embodiment of the present invention is to retrieve the granular packet rates from 300 and 320 via host interfaces 308, 328 and combine them in a scalable way. According to an embodiment of the present invention, the scalability relates to having multiple DDoS attack mitigation components centrally controlled by a single controlling host. The ability to combine various granular packet rates and come up with a single rate and then use that rate for estimation of future packet rate adaptive thresholds facilitates the scalable DDoS attack mitigation architecture described herein.

Table 1 through Table 4 describe the scaling treatment of layer 2 through layer 7 parameters in accordance with an embodiment of the present invention. For example, in Table 2, if two DDoS attack mitigation components have rates for SYN packets/second as 5,000 and 10,000 respectively, the effective rate taken for both together would be 10,000 per second if MAX is chosen as the default scaling treatment type. Thus if the packets switch from one to another over time, the MAX of the two is applied to both as the learned threshold in some form. The actual threshold may have some cushion over the actual rate as is well-known to those in the art, thus ensuring that there are no false positive drops of genuine packets. The actual granular threshold may also depend on the base, trend and the seasonality of the granular packet rates to ensure proper treatment for the behavior of the packets over time. This and other techniques are well known in the art and are described well in the related patents.

For certain other parameters, it may be appropriate to sum up the granular packet rates to determine the final estimated thresholds. Such scaling treatment is described as Sum in the following tables. Max and Sum scaling treatments are examples and are not intended to be limiting as various other treatments are possible.

TABLE 1

Layer 2 Behavioral Parameters Examples and their Scaling Treatment

| Name | Scaling Treatment |
|---|---|
| ARP | Max |
| RARP | Max |
| Broadcast | Max |
| Multicast | Max |
| Non-IP | Max |
| VLAN-Tagged | Max |

Table 1 describes the preferred treatment of scaling example Layer 2 behavioral parameters when multiple DDoS attack mitigation components are used.

TABLE 2

Layer 3 Behavioral Parameters Examples and their Scaling Treatment

| Name | Scaling Treatment |
|---|---|
| Fragment | Max |
| Protocols | Max |
| Most Active Source | Max |
| Most Active Destination | Max |
| Count of Unique Sources | Sum |

Table 2 describes the preferred treatment of scaling example Layer 3 behavioral parameters when multiple DDoS attack mitigation components are used.

TABLE 3

Layer 4 Behavioral Parameters Examples and their Scaling Treatment

| Name | Scaling Treatment |
|---|---|
| SYN | Max |
| ACK | Max |
| FIN | Max |
| PUSH | Max |
| RST | Max |
| SYN/Source | Max |
| ACK/Source | Max |
| FIN/Source | Max |
| PUSH/Source | Max |
| RST/Source | Max |
| SYN/Destination | Max |
| ACK/Destination | Max |
| FIN/Destination | Max |
| PUSH/Destination | Max |

TABLE 3-continued

Layer 4 Behavioral Parameters Examples and their Scaling Treatment

| Name | Scaling Treatment |
|---|---|
| RST/Destination | Max |
| Established connections/Destination | Sum |
| Concurrent Connections/Source | Sum |
| Concurrent Connections/Destination | Sum |
| TCP Ports | Max |
| UDP Ports | Max |
| ICMP Type/Codes | Max |

Table 3 describes the preferred treatment of scaling example Layer 4 behavioral parameters when multiple DDoS attack mitigation components are used.

TABLE 4

Layer 7 Behavioral Parameter examples and their Scaling Treatment

| Name | Scaling Treatment |
|---|---|
| HTTP Methods | Max |
| SIP Methods | Max |
| DNS Queries | Max |
| DNS Response | Max |
| HTTP URLs | Max |
| SIP URLs | Max |
| HTTP User Agents | Max |
| SIP User Agents | Max |
| HTTP URLs/Source | Sum |

Table 4 describes the preferred treatment of scaling example Layer 7 behavioral parameters when multiple DDoS attack mitigation components are used.

Figure 4:
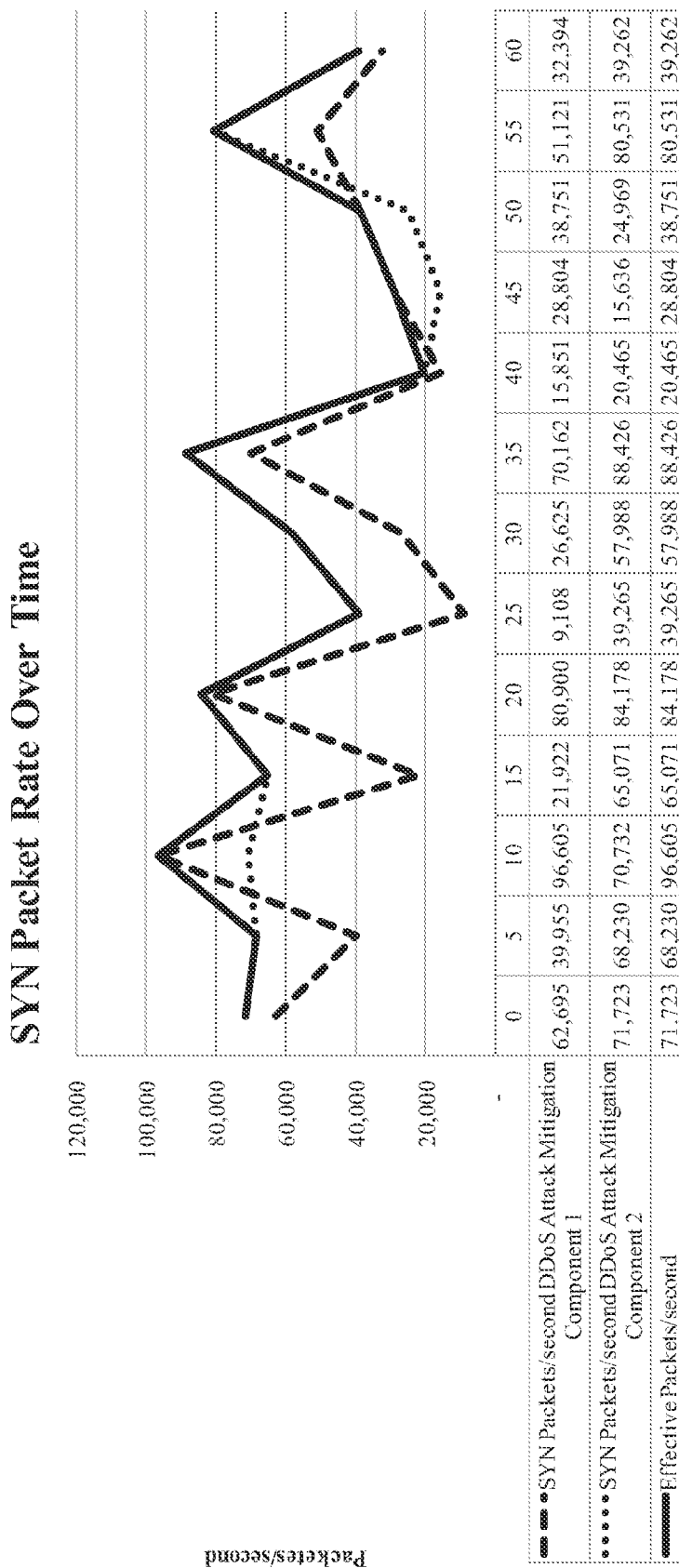
FIG. 4 illustrates a table and chart for exemplary packet rate derivation in accordance with an embodiment of the present invention.

FIG. 4 illustrates a table and chart for exemplary packet rate derivation in accordance with an embodiment of the present invention. The present example further illustrates the details for scaling treatment for an exemplary packet rate for SYN packets to a network. In FIG. 4, SYN packet rates from two DDoS attack mitigation components are available to the controlling host. The controlling host has chosen the MAX scaling treatment for the packet rate. Thirteen exemplary samples over 1 hour at 5 minute intervals are available. The task of the controlling host is to determine the effective rate after obtaining the maximum packet rate for the 5 minute intervals from both the engines. The engine chooses the maximum of the two values and stores as the final value for calculating the adaptive threshold which will be sent to the two engines in the subsequent time cycles.

Figure 5:
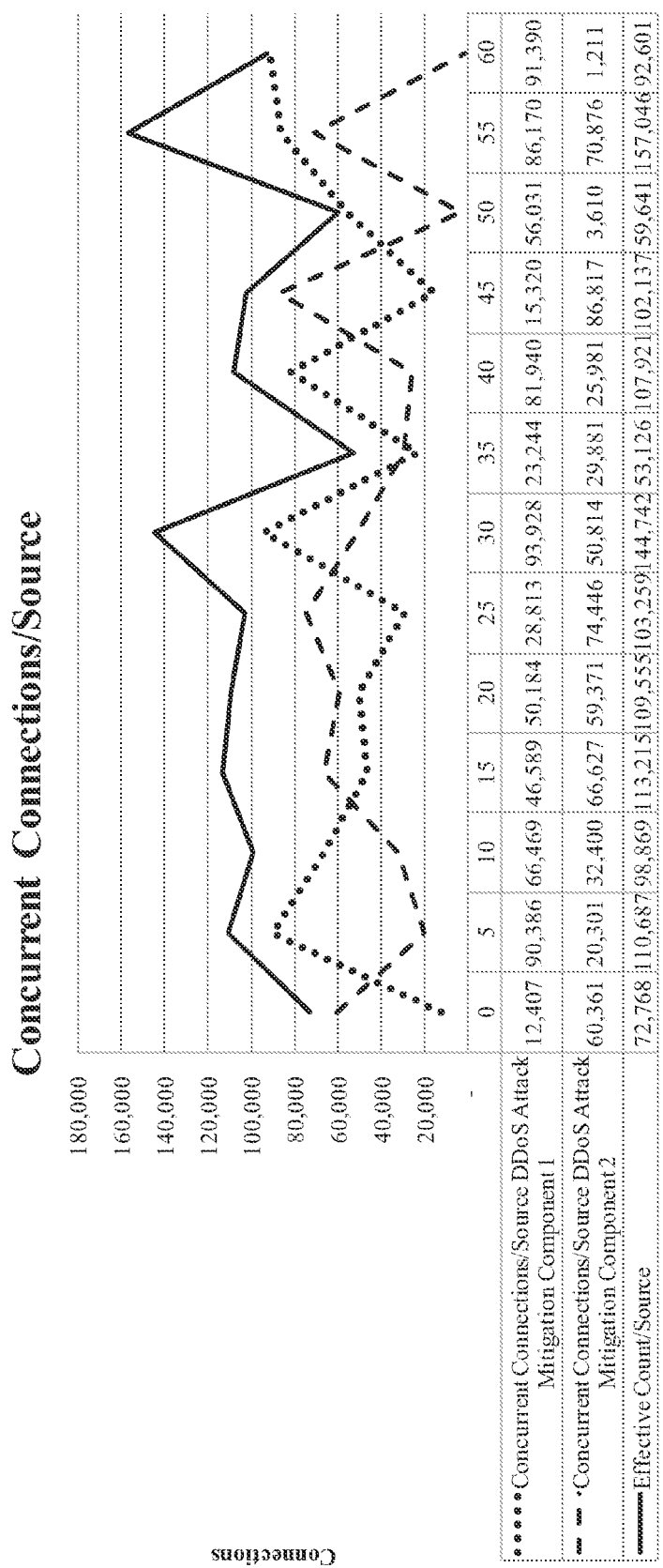
FIG. 5 illustrates a table and a chart for exemplary packet count derivation in accordance with an embodiment of the present invention.

FIG. 5 illustrates a table and a chart for exemplary packet count derivation in accordance with an embodiment of the present invention. The present example further illustrates the details for scaling treatment for an exemplary packet rate for Concurrent Connections/Source to a network. In FIG. 5, TCP Concurrent Connections/Source counts from two DDoS attack mitigation components are available to the controlling host. The controlling host has chosen the SUM scaling treatment for the packet counts. As above, thirteen exemplary samples over 1 hour at 5 minute intervals are available. The task of the controlling host is to determine the effective count after obtaining the maximum count for the 5 minute intervals from both the engines. The engine chooses the sum of the two values and stores as the final value for calculating the adaptive threshold which will be sent to the two engines in the subsequent time cycles.

Figure 6:
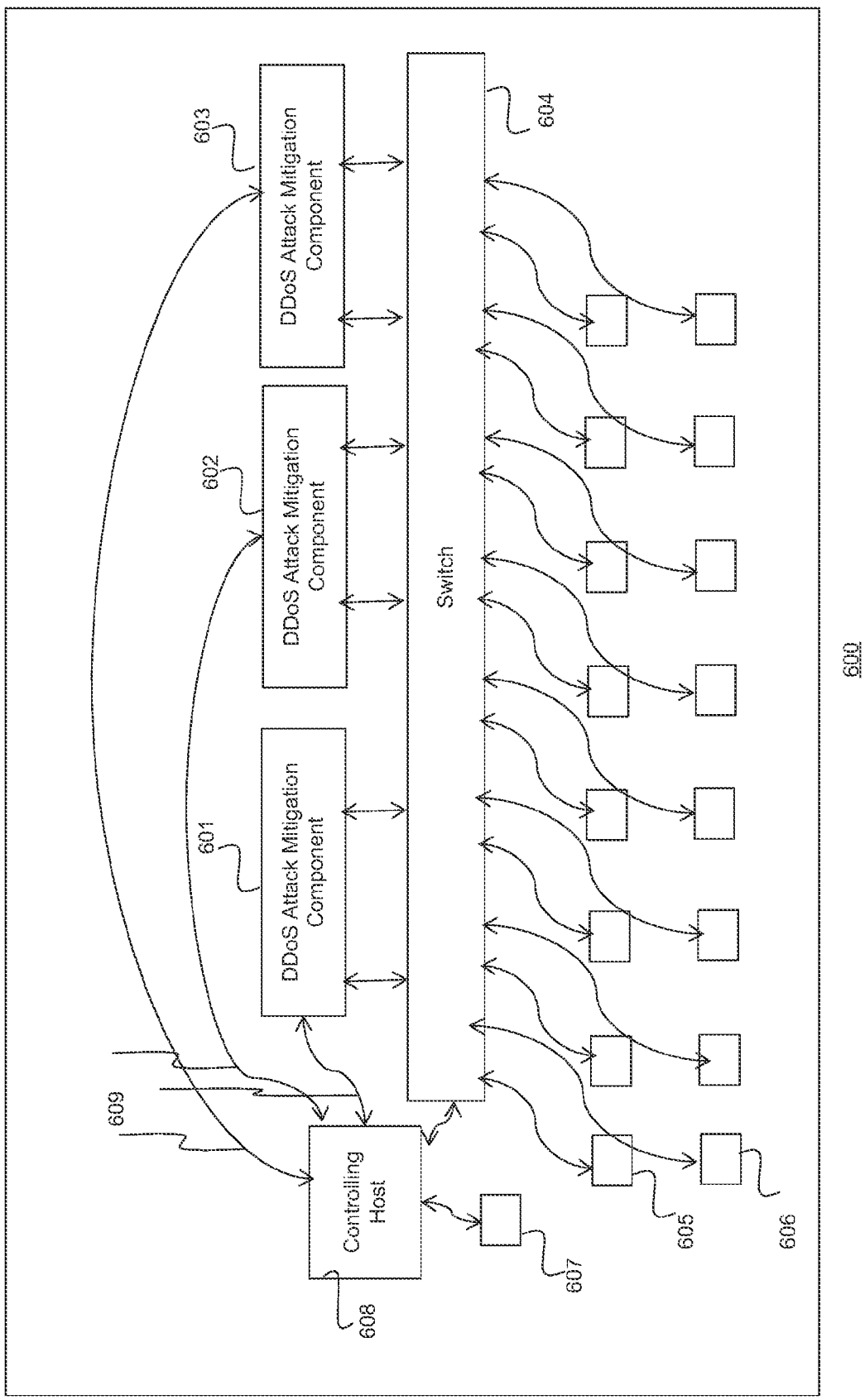
FIG. 6 illustrates an exemplary appliance in accordance with an embodiment of the present invention that has multiple data ports served by multiple DDoS attack mitigation components using a switch to distribute the load to the mitigation components.

FIG. 6 illustrates an exemplary appliance in accordance with an embodiment of the present invention that has multiple data ports served by multiple DDoS attack mitigation components using a switch to distribute the load to the mitigation components. In the present example, further integrated details of an exemplary embodiment of an apparatus 600 are provided. Three DDoS attack mitigation components 601, 602, and 603 are connected to the network ports via switch 604. The switch is connected to data ports 605, 606 etc. which are equivalent to ingress and egress ports in FIGS. 1 and 2. The switch is controlled by the controlling host 608. The controlling host 608 also retrieves granular packet rates from 601, 602 and 603 and sets granular thresholds based on the scaling treatment described earlier back in the DDoS attack mitigation components 601, 602 and 603. The controlling host also reads the statistics and shows it to the end-user or administrator of the apparatus via a management port 607.

The switch 604 may have distribution logic among the available DDoS attack mitigation components 601, 602 and 603. In an exemplary embodiment of the invention, the switch 604 may associate the ports one to one with the DDoS attack mitigation components 601, 602, and 603. For example, if there are two DDoS attack mitigation components and eight pairs of ports, four port pairs may be served by one DDoS attack mitigation component while the other four may be served by the second DDoS attack mitigation component.

In another embodiment, the switch may distribute the load based on more complex logic such as IP Source, IP Destination, TCP/UDP Ports, etc.

It is important however to note that the return packet from the DDoS attack mitigation component should be sent back on the corresponding pair port. As such, a mechanism should be implemented to identify on which port a packet was received. For example, the switch may remember which port a packet came on, so that the return packet from the DDoS attack mitigation component is always sent back on the corresponding pair port.

Embodiments of the present invention include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, controlling host 608 includes a bus 609, a processor, communication port etc. A person skilled in the art will appreciate that a controlling host may include more than one processor and communication ports.

Examples of processor include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor may include various modules associated with monitoring unit as described in FIG. 6. Processor may include parameter fetching module for fetching parameters shared by other networks.

Management port 607 can be any of an RS-232 port for use with a modem based dialup connection, a 10/100 Ethernet port, a Gigabit or 10 Gigabit port using copper or fiber, a serial port, a parallel port, or other existing or future ports. Data ports 605, 606 may be chosen depending on a network, such as a Local Area Network (LAN), Wide Area Network (WAN), or any network to which computer system connects.

Bus 609 communicatively couples controlling host 608 with the other blocks. Bus 609 can be, such as a Peripheral Component Interconnect (PCI)/PCI Extended (PCI-X) bus, Small Computer System Interface (SCSI), XAUI (10 G Attachment Unit Interface), USB or the like, for connecting expansion cards, drives and other subsystems as well as other buses, such a front side bus (FSB).

Optionally, operator and administrative interfaces, such as a display, keyboard, and a cursor control device, may also be coupled to bus 609 to support direct operator interaction with controlling host 608. Other operator and administrative interfaces can be provided through network connections connected through management port 607.

Removable storage media may be attached to the host to provide and store statistics and policies. This can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

Figure 7A:
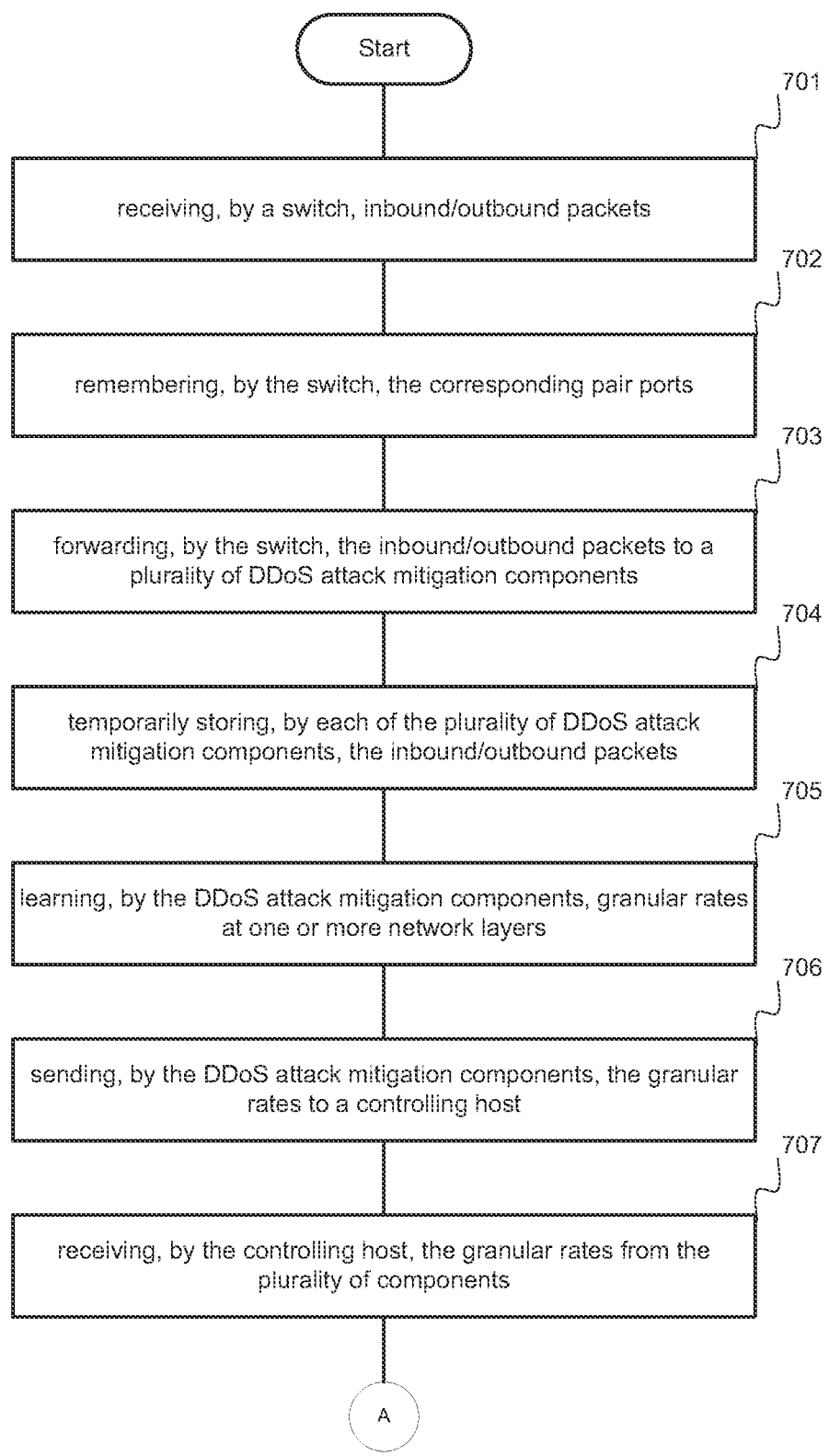
FIGS. 7A and 7B are flow charts illustrating an inline DDoS attack mitigation process in accordance with an embodiment of the present invention.
Figure 7B:
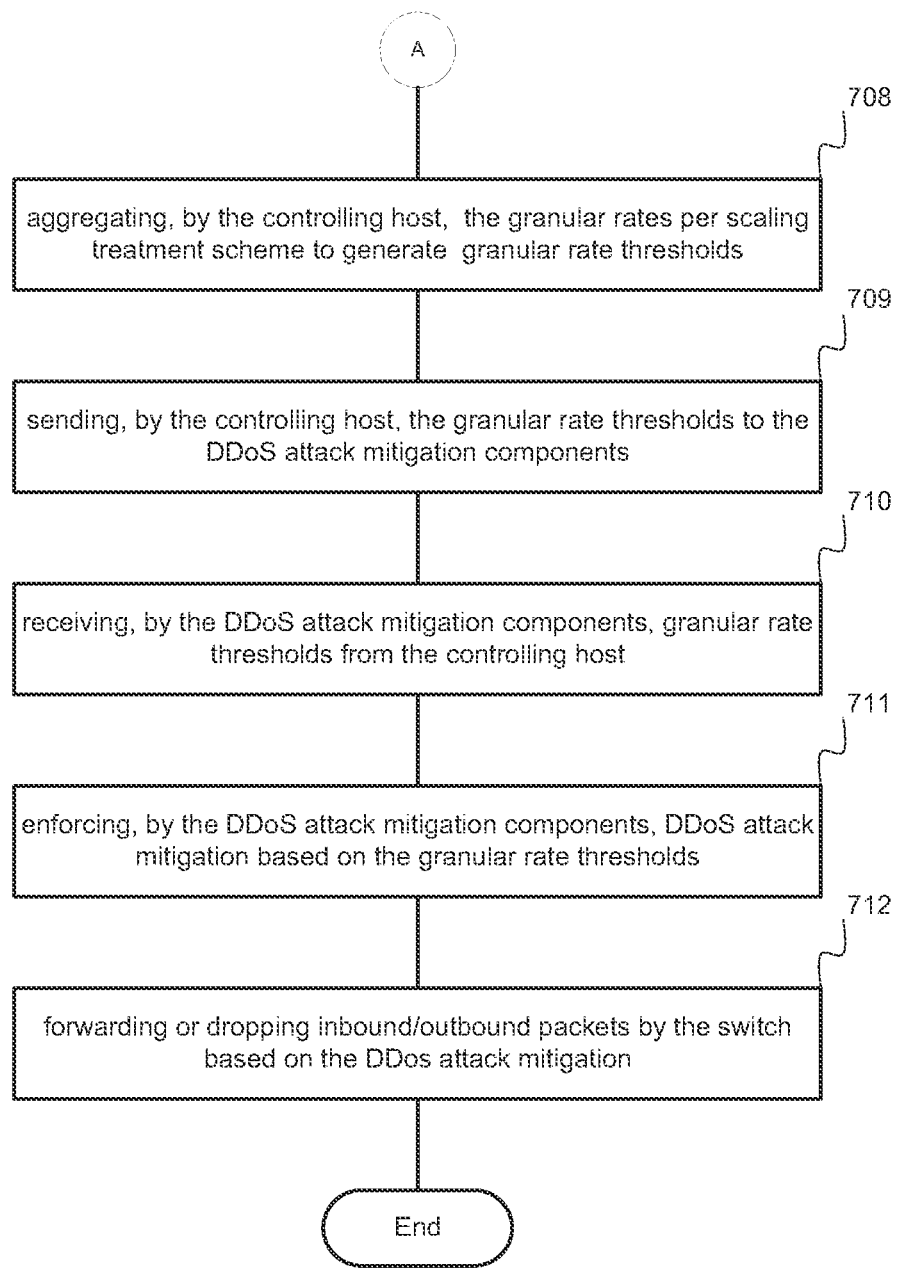

FIGS. 7A and 7B are flow charts illustrating an inline DDoS attack mitigation process in accordance with an embodiment of the present invention. The present example illustrates the multiple DDoS attack mitigation components stacking together to increase throughput.

At block 701, a switch receives inbound/outbound packets by a data interface. The switch connects an internal network to an external network through the data interface so that inbound/outbound packets to/from the internal network may be delivered to their destination.

At block 702, the switch remembers the corresponding pair ports of the received packets so that the inbound/outbound packets are forwarded to a pair port.

At block 703, the switch forwards the inbound/outbound packets to multiple DDoS attack mitigation components which are connected to the switch based on a distribution logic. In one embodiment, simple distribution logic may be implemented by assigning one DDoS attack mitigation component to serve packets from some ports of the switch while assigning another DDoS attack mitigation component to serve packets from other ports of the switch. In another embodiment, the switch may distribute the load to multiple DDoS attack mitigation components based on more complex logic so that the load balancing of the multiple DDoS attack mitigation components may be dynamically adjusted.

At block 704, a DDoS attack mitigation component temporarily store the inbound/outbound packets forwarded by the switch. Meanwhile, each of the DDoS attack mitigation components also sets necessary data structures in memory of logic blocks through host commands.

At block 705, each of the multiple DDoS attack mitigation components learn its granular rates at one or more network layers. The granular rates may be periodically calculated by each of the multiple DDoS attack mitigation components at layer 2, 3, 4, and/or 7 based on individual protocols or individual parameters or commands of the protocols. In one embodiment, a continuous and adaptive granular rate anomaly engine of each of the DDoS attack mitigation components determines the granular rates based on packet meta information received from the at least one data interface.

At block 706, each of the multiple DDoS attack mitigation components sends the granular rates to a controlling host. In one embodiment, a continuous and adaptive granular rate anomaly engine of each of the DDoS attack mitigation components also sends granular network layer drop statistics to the controlling host over a host interface.

At block 707, the controlling host receives the granular rates from the DDoS attack mitigation components.

At block 708, the controlling host aggregates the granular rates per scaling treatment scheme to generate granular rate thresholds. The controlling may have a scaling treatment scheme for each of the granular rate as shown in the above mentioned Tables 1-4. The person skilled in the art will appreciate that other scaling treatment scheme is also possible, such as median, average or weighted average scaling treatment scheme. The scaling treatment scheme may be select to avoid false negatives so that the thresholds are not too high and to avoid false positives so that the thresholds are not too low and at the same time, the occasional switching of traffic from an interface to the other does not cause unexpected results in mitigation. In one embodiment, the continuous and adaptive granular rate anomaly engine of each of the DDoS attack mitigation components sets the granular rate thresholds based on commands received from the controlling host over a host interface. In another embodiment, the controlling host combines the granular rates from multiple DDoS attack mitigation components by using multiple scaling treatments to arrive at an effective rate to be used for adaptive threshold calculation.

At block 709, the controlling host sends the granular rate thresholds to the DDoS attack mitigation components so that the DDoS attack mitigation components may adaptively control the DDoS attack.

At block 710, each of the DDoS attack mitigation components receives the granular rate thresholds from the controlling host.

At block 711, each of the DDoS attack mitigation components enforces DDoS attack mitigation based on the granular rate thresholds received from the controlling hosts. As the controlling host continually adjusts the rate thresholds, the inbound/outbound packets may be forwarded or dropped based on decision by a continuous and adaptive granular rate anomaly engine of each of the DDoS attack mitigation components.

At block 712, the switch forwards or drops inbound/outbound packets based on the DDoS attack mitigation decision.

Although embodiments of the present invention and their various advantages have been described in detail, it should be understood that the present invention is not limited to or defined by what is shown or discussed herein.

Moreover, as one skilled in the art will appreciate, any digital computer systems can be configured or otherwise programmed to implement the methods and apparatuses disclosed herein, and to the extent that a particular digital computer system is configured to implement the methods and apparatuses of this invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

What is claimed is:

1. An apparatus capable of enforcing behavioral policies and preventing Distributed Denial of Service (DDoS) attacks, the apparatus comprising:
   a plurality of data interfaces configured to receive and forward or drop inbound/outbound packets;
   a plurality of DDoS attack mitigation components configured to (i) continuously learn granular rates at a plurality of Open System Interconnection (OSI) model network layers, wherein the granular rates represent observed rates of parameters for one or more of OSI model layer 2, layer 3, layer 4 or layer 7 within the inbound/outbound packets during a period of time; (ii) send information regarding the granular rates back to a controlling host; (iii) receive granular rate thresholds from the controlling host, and (iv) perform adaptive DDoS attack mitigation based on the granular rate thresholds;
   a switch, coupled to the plurality of DDoS attack mitigation components, configured to forward the inbound/outbound packets to the plurality of DDoS attack mitigation components and remember a port on which the inbound/outbound packets were received to facilitate forwarding of packets processed by the plurality of DDoS attack mitigation components over a corresponding pair port;
   a controlling host configured to (i) receive granular rate data relating to the learned granular rates from the plurality of DDoS attack mitigation components, (ii) aggregate the received granular rate data in accordance with a scaling treatment scheme to generate the granular rate thresholds and (iii) send the granular rate thresholds to the plurality of DDoS attack mitigation components; and
   a host interface connecting the plurality of DDoS attack mitigation components to the controlling host.

2. The apparatus of claim 1, wherein each of the plurality of DDoS attack mitigation components is further operable to maintain data structures in their respective memories responsive to host commands received from the controlling host.

3. The apparatus of claim 1, wherein the plurality of data interfaces comprise one or more of a copper interface and a fiber interface.

4. The apparatus of claim 1, wherein each of the plurality of DDoS attack mitigation components (i) comprises a pair of ports for receiving the inbound/outbound packets from the switch and (ii) are configured to perform behavioral DDoS attack mitigation.

5. The apparatus of claim 1, wherein each of the plurality of DDoS attack mitigation components comprises packet interfaces configured to temporarily store, then forward or drop the inbound/outbound packets based on a decision by a continuous and adaptive granular rate anomaly engine.

6. The apparatus of claim 1, wherein each of the plurality of DDoS attack mitigation components comprises a continuous and adaptive granular rate anomaly engine configured to determine the granular rates based on packet meta information received from the plurality of data interfaces.

7. The apparatus of claim 1, wherein each of the plurality of DDoS attack mitigation components comprises a continuous and adaptive granular rate anomaly engine configured to send granular network layer drop statistics to the controlling host over the host interface.

8. The apparatus of claim 1, wherein each of the plurality of DDoS attack mitigation components comprises a continuous and adaptive granular rate anomaly engine configured to set the granular rates thresholds based on commands received from the controlling host over the host interface.

9. The apparatus of claim 1, wherein the controlling host further combines the granular rates received from the plurality of DDoS attack mitigation components and uses a plurality of scaling treatments to arrive at an effective rate to be used for adaptive threshold calculation.

10. The method of claim 1, wherein a layer 2 granular rate of the granular rates for layer 2 of the OSI model comprises an observed packet rate for Address Resolution Protocol (ARP), Reverse ARP (RARP) or broadcast packets.

11. The method of claim 1, wherein a layer 3 granular rate for layer 3 of the OSI model comprises an observed packet rate for a particular protocol, a particular Internet Protocol (IP) option, fragmented packets or an observed packet rate from a particular source.

12. The method of claim 1, wherein a layer 4 granular rate for layer 4 of the OSI model comprises an observed packet rate for a particular Transmission Control Protocol (TCP) port or a particular User Datagram Protocol (UDP) port.

13. The method of claim 1, wherein a layer 7 granular rate for layer 7 of the OSI model comprises an observed packet rate for a particular Hypertext Transfer Protocol (HTTP) method, a particular HTTP user-agent, a particular Uniform Resource Locator (URL) or an observed rate of Session Initiation Protocol (SIP) registration requests or Domain Name System (DNS) requests.

14. A method comprising:
receiving, by at least one data interface of a switch, inbound/outbound packets;
distributing, by the switch, the inbound/outbound packets among a plurality of Distributed Denial of Service (DDoS) attack mitigation components;
remembering, by the switch, ports on which the inbound/outbound packets were received to facilitate forwarding of the inbound/outbound packets processed by the plurality of DDoS attack mitigation components on corresponding pair ports;
continuously learning, by the plurality of DDoS attack mitigation components, granular rates at a plurality of Open System Interconnection (OSI) model network layers, wherein the granular rates represent observed rates of parameters for one or more of OSI model layer 2, layer 3, layer 4 or layer 7 within the inbound/outbound packets during a period of time;
sending, by the plurality of DDoS attack mitigation components, the granular rates to a controlling host;
receiving, by the controlling host, the granular rates from the plurality of DDoS attack mitigation components;
aggregating, by the controlling host, the granular rates in accordance with a scaling treatment scheme to generate granular rate thresholds;
sending, by the controlling host, the granular rate thresholds to the plurality of DDoS attack mitigation components;
receiving, by the plurality of DDoS attack mitigation components, granular rate thresholds from the controlling host;
performing, by the plurality of DDoS attack mitigation components, adaptive DDoS attack mitigation by enforcing the granular rate thresholds; and
forwarding or dropping, by the plurality of DDoS attack mitigation components, the inbound/outbound packets based on results of the adaptive DDoS attack mitigation.

15. The method of claim 14, further comprising maintaining by each of the DDoS attack mitigation components, data structures in memory responsive to host commands received from the controlling host.

16. The method of claim 14, further comprising:
temporarily storing, by each of the plurality of DDoS attack mitigation components, the inbound/outbound packets; and
forwarding or dropping, by each of the plurality of DDoS attack mitigation components, the inbound/outbound packets based on a decision by a continuous and adaptive granular rate anomaly engine.

17. The method of claim 14, further comprising determining, by a continuous and adaptive granular rate anomaly engine of each of the plurality of DDoS attack mitigation components, the granular rates based on packet meta information received from the at least one data interface.

18. The method of claim 14, further comprising sending, by a continuous and adaptive granular rate anomaly engine of each of the plurality of DDoS attack mitigation components, granular network layer drop statistics to the controlling host over a host interface.

19. The method of claim 14, further comprising setting, by a continuous and adaptive granular rate anomaly engine of each of the plurality of DDoS attack mitigation components, the granular rate thresholds based on commands received from the controlling host over a host interface.

20. The method of claim 14, further comprising combining, by the controlling host, the granular rates from a plurality of DDoS attack mitigation components by using a plurality of scaling treatments to arrive at an effective rate to be used for adaptive threshold calculation.

* * * * *